United States Patent
Johnson, Jr.

(10) Patent No.: US 8,659,187 B2
(45) Date of Patent: *Feb. 25, 2014

(54) UNINTERRUPTIBLE POWER SUPPLY SYSTEMS AND METHODS SUPPORTING LOAD BALANCING

(71) Applicant: Eaton Corporation, Cleveland, OH (US)

(72) Inventor: Robert William Johnson, Jr., Raleigh, NC (US)

(73) Assignee: Eaton Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/845,859

(22) Filed: Mar. 18, 2013

(65) Prior Publication Data

US 2013/0214604 A1    Aug. 22, 2013

Related U.S. Application Data

(63) Continuation of application No. 12/779,483, filed on May 13, 2010, now Pat. No. 8,410,638.

(51) Int. Cl.
*H02J 1/02* (2006.01)
(52) U.S. Cl.
USPC ........................................................ 307/105
(58) Field of Classification Search
USPC ........................................................ 307/105
See application file for complete search history.

(56) References Cited

U.S. PATENT DOCUMENTS

| 4,177,508 | A  | 12/1979 | Schmid |
|-----------|----|---------|--------|
| 5,329,222 | A  | 7/1994  | Gyugyi et al. ................ 323/207 |
| 5,343,079 | A  | 8/1994  | Mohan et al. ................ 307/105 |
| 5,929,538 | A  | 7/1999  | O'Sullivan et al. |
| 6,134,124 | A  | 10/2000 | Jungreis et al. |
| 6,847,130 | B1 | 1/2005  | Belehradek et al. |
| 7,212,421 | B2 | 5/2007  | Chandra et al. |
| 7,372,709 | B2 | 5/2008  | Mazumder et al. ............. 363/16 |
| 7,411,308 | B2 | 8/2008  | Parmley |

(Continued)

FOREIGN PATENT DOCUMENTS

| DE | 2702078 A1 | 7/1978 |
| EP | 1965487 A1 | 9/2008 |
| SE | 7710579    | 3/1978 |

OTHER PUBLICATIONS

Hosseini et al; *Three-Phase Four-Wire Grid-Connected PV Power Supply with Accurate MPPT for Unbalanced Nonlinear Load Compensation*, IEEE International Symposium on Industrial Electronics (ISIE 2009); Seoul Olympic Parktel, Seoul, Korea; Jul. 5-8, 2009; pp. 1099-1104.

(Continued)

*Primary Examiner* — Robert L. Deberadinis
(74) *Attorney, Agent, or Firm* — Myers Bigel Sibley & Sajovec, P.A.

(57) ABSTRACT

An uninterruptible power supply (UPS) system that includes a multiphase AC output configured to be coupled to a load, an inverter having an output coupled to the AC output and a control circuit operatively associated with the inverter and configured to cause the inverter to compensate for a phase imbalance of a load coupled to the AC output while power is being delivered to the load from an AC power source independently of the inverter.

15 Claims, 6 Drawing Sheets

(56) References Cited

U.S. PATENT DOCUMENTS

| | | | |
|---|---|---|---|
| 7,652,393 | B2 | 1/2010 | Moth |
| 7,733,670 | B2 | 6/2010 | Feng et al. ............... 363/17 |
| 8,410,638 | B2 * | 4/2013 | Johnson, Jr. ............. 307/105 |
| 2004/0084965 | A1 | 5/2004 | Welches et al. ............. 307/64 |
| 2004/0145188 | A1 | 7/2004 | Janssen et al. |
| 2007/0076444 | A1 | 4/2007 | McNulty et al. |
| 2008/0030027 | A1 | 2/2008 | Erdman et al. |
| 2008/0111424 | A1 | 5/2008 | Yeh |
| 2008/0130332 | A1 | 6/2008 | Taimela et al. ............ 363/95 |
| 2008/0185915 | A1 | 8/2008 | Wang |
| 2008/0217998 | A1 | 9/2008 | Parmley |
| 2009/0284074 | A1 | 11/2009 | Yeh |

OTHER PUBLICATIONS

Casadei, et al.; *Power Quality Improvement and Uninterruptible Power Supply Using a Power Conditioning System with Energy Storage Capability*; IEEE, Transactions on Industrial Electronics, IEEE Piscataway, N.J.; Jun. 27, 2005, pp. 1-7.

Kedjar et al., *DSP-Based Implementation of an LQR with Integral Action for a Three-Phase Three-Wire Shunt Active Power Filter*, IEEE Service Center, Piscataway, N.J.; vol. 56, No. 8; Aug. 1, 2009; pp. 2821-2828.

Segui et al., *Control of Shunt Unbalanced Power Active Compensators for Reactive and Asymmetry Elimination in Four Wire Electrical Systems using Symmetrical Components*, 2004 35$^{th}$ Annual IEEE Power Electronics Specialists Conference; Aachen, Germany, Jun. 20-25, 2004; pp. 3139-3145.

International Search Report and Written Opinion corresponding to International Application No. PCT/IB2011/001022; Date of Mailing: Jul. 12, 2012; 14 pages.

Jayasimha et al.; *Photovoltaic UPS*; IEEE TENCON 2003 Conference on Convergent Technologies for Asia-Pacific Region, vol. 4, pp. 1419-1423 (2003).

* cited by examiner

UNINTERRUPTIBLE POWER SUPPLY SYSTEMS AND METHODS SUPPORTING LOAD BALANCING

CROSS REFERENCE TO RELATED APPLICATIONS

This application is a continuation of U.S. patent application Ser. No. 12/779,483, filed May 13, 2010, now U.S. Pat. No. 8,410,638, the disclosure of which is hereby incorporated herein in its entirety by reference.

BACKGROUND

The inventive subject matter relates to power supply systems and methods and, more particularly, to uninterruptible power supply (UPS) systems and methods.

Data centers, industrial facilities, medical facilities and the like often have three-phase AC power distribution systems that are protected by UPS systems. Three-phase UPS systems may be used in such applications to provide backup power to maintain operation in event of failure of the primary utility supply. Three-phase UPS systems commonly have an "on-line" configuration including a rectifier and inverter coupled by a DC link that is also coupled to an auxiliary source, such as a battery, flywheel converter or other energy storage device.

A frequent goal in such applications is to provide uninterruptible power with high efficiency. Towards this end, on-line UPSs may support an "efficiency" mode in which the rectifier/inverter conversion chain is bypassed using a static switch when the utility source is within nominally acceptable bounds, so that power is not needlessly wasted in the rectifier/inverter chain. In addition, renewable sources, such as photovoltaic sources, may be coupled to the DC link of an on-line UPS to provide supplemental power, as described, for example, in U.S. Pat. No. 7,411,308 to Parmley and an article entitled "Photovoltaic UPS" by Jayasimha et al., IEEE TENCON 2003 Conference on Convergent Technologies for Asia-Pacific Region, vol. 4, pp. 1419-1423 (2003).

SUMMARY

Some embodiments of the inventive subject matter provide an uninterruptible power supply (UPS) system that includes a multiphase AC output configured to be coupled to a load, an inverter having an output coupled to the AC output and a control circuit operatively associated with the inverter and configured to cause the inverter to compensate for a phase imbalance of a load coupled to the AC output while power is being delivered to the load from an AC power source independently of the inverter.

In some embodiments, the control circuit may be configured to cause the inverter to load a first phase at the AC output and transfer power therefrom to a second phase at the AC output to compensate for a phase imbalance of a load coupled to the AC output. In some embodiments, the inverter may have a DC input coupled to an auxiliary power source, such as a battery and/or a variably available solar or wind power source. The control circuit may be configured to cause the inverter to transfer power between the auxiliary power source and a phase at the AC output to compensate for the phase imbalance.

In further embodiments, the UPS system includes an AC input configured to be coupled to the AC power source, a rectifier configured to receive power from the AC input, a DC link coupling an output of the rectifier to an input of the inverter and a bypass circuit configured to selectively couple and decouple the AC input and the AC output. The control circuit may be configured to cause the inverter to load a first phase at the AC output and transfer power therefrom to a second phase at the AC output to compensate for phase imbalance of a load coupled to the AC output when the AC input is coupled to the AC input by the bypass circuit. The DC link may be coupled to an auxiliary power source, and the control circuit may be further configured to cause the inverter to transfer power between the auxiliary power source and the load to compensate for the phase imbalance. The auxiliary power source may include a battery or other energy storage device and/or variably available power source, such as a solar power source or a wind power source.

Additional embodiments provide an apparatus including an inverter coupled to a multiphase AC power source and a control circuit operatively associated with the inverter and configured to cause the inverter to load a first phase of the AC power source and transfer power therefrom to a second phase of the AC power source to compensate for a phase imbalance of a load coupled to the AC power source. The inverter may be an inverter of a UPS.

Some method embodiments of the inventive subject matter include coupling one or more loads to a multiphase AC power source and operating an inverter coupled to the multiphase AC power source to compensate for a phase imbalance of the one or more loads while power is being delivered to the load from the AC power source independently of the inverter. The inverter may be an inverter of a UPS. An input of the inverter may be coupled to an auxiliary power source and power may be transferred between the auxiliary power source and the load via the inverter to compensate for the phase imbalance.

DETAILED DESCRIPTION OF EXEMPLARY EMBODIMENTS

Figure 1:
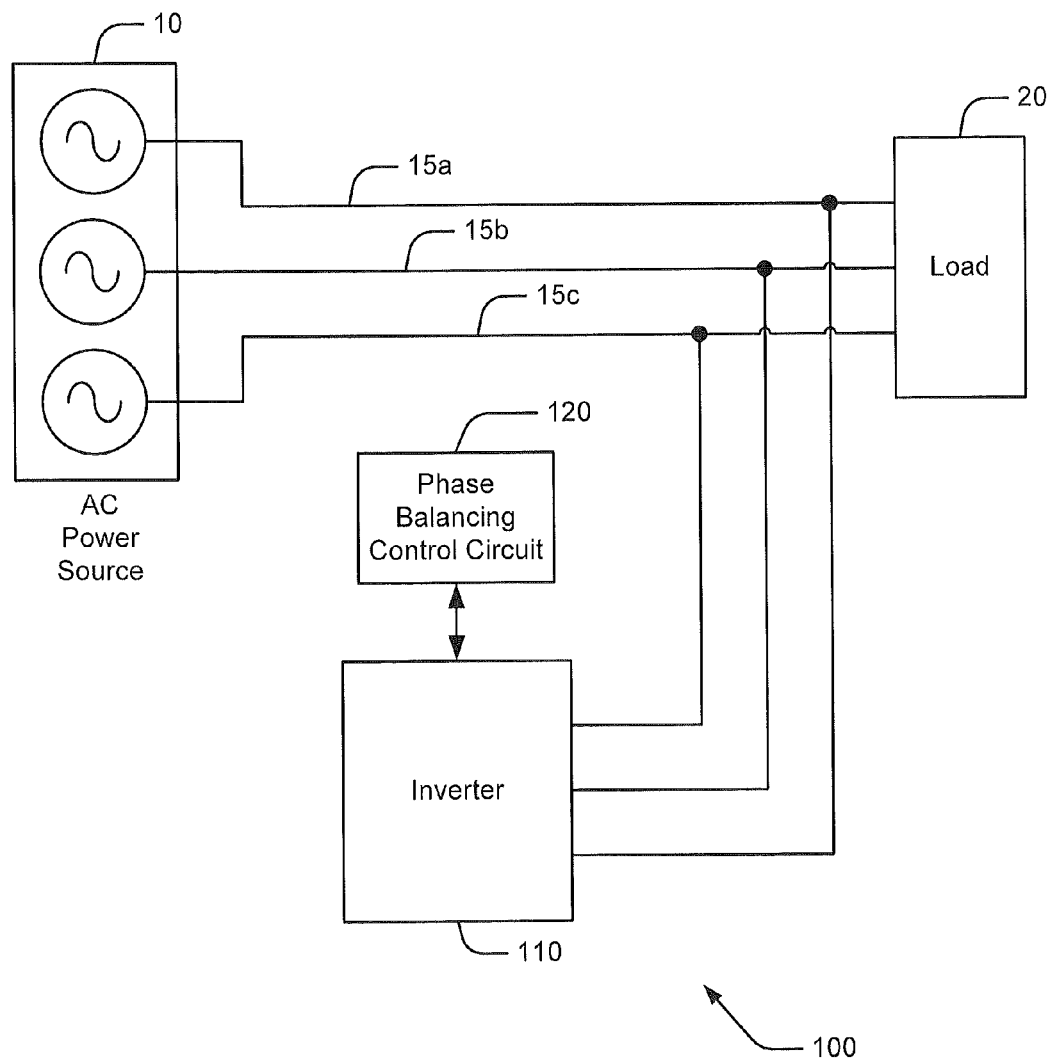
FIG. 1 is a schematic diagram illustrating a UPS system according to some embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements, It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As will be appreciated by one of skill in the art, the inventive subject matter may be embodied as systems, methods and computer program products. Some embodiments of the inventive subject matter may include hardware and/or combinations of hardware and software. Some embodiments of the inventive subject matter include circuitry configured to provide functions described herein. It will be appreciated that such circuitry may include analog circuits, digital circuits, and combinations of analog and digital circuits.

Embodiments of the inventive subject matter are described below with reference to block diagrams and/or operational illustrations of systems and methods according to various embodiments of the inventive subject matter. It will be understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. In some implementations, the functions/acts noted in the figures may occur out of the order noted in the block diagrams and/or operational illustrations. For example, two operations shown as occurring in succession may, in fact, be executed substantially concurrently or the operations may sometimes be executed in the reverse order, depending upon the functionality/acts involved.

Some embodiments of the inventive subject matter relate to interfacing of variably available power sources with UPSs. As referred to herein, "variably available power sources" include power sources, such as solar, wind, tidal and similar renewable energy sources, having an availability (e.g., presence and capacity) that fluctuates with environmental conditions (e.g., availability of wind, sun or tidal change) and that are not, as a general rule, available on demand. Such power sources may also be referred to as "variable", "intermittent" or "non-dispatchable" and, for purposes of the present application, such sources shall be referred to as "variably available power sources."

In some multi-phase UPS applications, such as data centers, a large number of single phase loads may be manually connected to the distribution system served by a multi-phase UPS. Because of the nature of the loads and the manner in which they are connected, this may result in an unbalanced loading of the distribution system. The utility provided to an installation may be shielded from this phase imbalance by an online UPS operating in an on-line mode, but the imbalance may be reflected to the utility if UPS is operating in a bypassed high efficiency mode. Some embodiments of the inventive subject matter arise from a realization that such imbalance may be addressed by using the output inverter of the UPS to selectively load the phases of the distribution to compensate for such load imbalance. For example, in some embodiments, the inverter may be used to transfer power between phases compensate for the load imbalance. According to further embodiments, a variably available power source, such as a photovoltaic source, may be used to compensate for load imbalance instead of, or in combination with, such inter-phase power transfers.

FIG. 1 illustrates a system 100 according to some embodiments of the inventive subject matter. The system 100 includes an inverter 110 coupled to a phases 15$a$, 15$b$, 15$c$ connecting a multiphase load 20 to an AC power source 10. The AC power source 10 may include, for example, a utility power source and or a local power source, such as a local generator. A phase-balancing control circuit 120 of the system 100 is operatively associated with the inverter 110 and configured to cause the inverter 110 to selectively load the phases 15$a$, 15$b$, 15$c$ to support inter-phase power transfers that compensate for phase imbalance of the load 20 while the AC power source 10 delivers power to the load 20 independently of the inverter 110. In this manner, the bulk of the power consumed by the load 20 may be efficiently delivered directly by the AC power source 10, and the inverter 110 may be limited to only processing the amount of power needed to make up for phase imbalance of the load 20. In on-line UPS system embodiments described below, such a technique may be advantageously used to support a high-efficiency bypass mode with inverter phase balancing that may avoid losses associated with using on-line operation to balance phases. In various embodiments, the system 100 may be a standalone device or in a UPS system, such as an on-line UPS, standby or line-interactive UPS.

Figure 2:
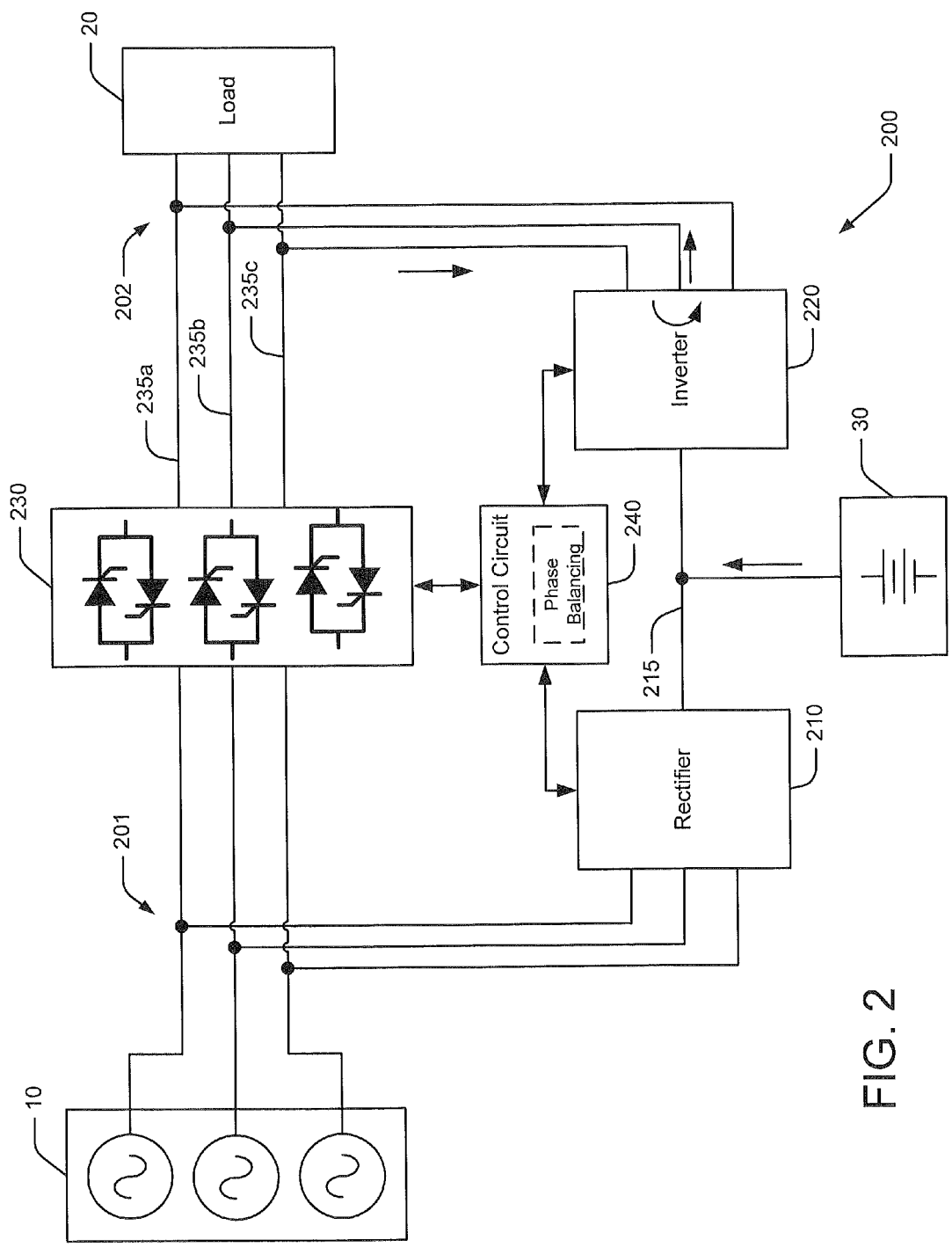
FIG. 2 is a schematic diagram illustrating a UPS system according to further embodiments of the inventive subject matter

FIG. 2 illustrates an on-line UPS system 200 according to some embodiments of the inventive subject matter. The UPS system 200 includes a series conversion circuit comprising a rectifier 210 and an inverter 220 coupled by a DC link 215. An input of the rectifier 210 is coupled to an AC input 201 that is configured to be coupled to an AC power source 10. An output of the inverter 220 is configured to be coupled to a load 20 at an AC output 202. The DC link 215 may be configured to be coupled to an auxiliary energy source 30, such as one or more batteries and/or other power sources, such as fuel cells or variably available power sources (e.g., solar or wind power sources). A bypass circuit, e.g., a static switch 230, is configured to couple and decouple the AC input 201 and the AC output 202 of the UPS system 200. For example, the static switch 230 may be used to couple the AC input 201 to the AC output 202 and thereby bypass the rectifier 210 and inverter 220 in a high-efficiency bypass mode of the UPS system 200. It will be appreciated that the above-described components may be integrated in one assembly or may implemented using multiple interoperating assemblies with connecting power and control links.

A control circuit 240 is operatively associated with the rectifier 210, inverter 220 and static switch 230. The control circuit 240 generally may be configured to, for example, monitor status of the AC power source 10, to control a DC voltage generated on the DC link 215 by the rectifier 210 and/or auxiliary energy source 30, to control operation of the static switch 230 to provide on-line and bypassed modes of operation and to control an AC waveform produced at the AC output 202 by the inverter 220 during on-line operation. The control circuit 240 is further configured to cause the inverter 220 to perform phase balancing operations along the lines discussed above with reference to FIG. 1 when the rectifier 210 and inverter 220 are bypassed, i.e., when the AC power source 10 is directly coupled to the load 20 by the bypass circuit 230. As illustrated, phase balancing may be accomplished by transferring power among AC phases 235a, 235b, 235c and/or by selectively transferring power between the AC phases 235a, 235b, 235c and the auxiliary power source 30.

Figure 3:
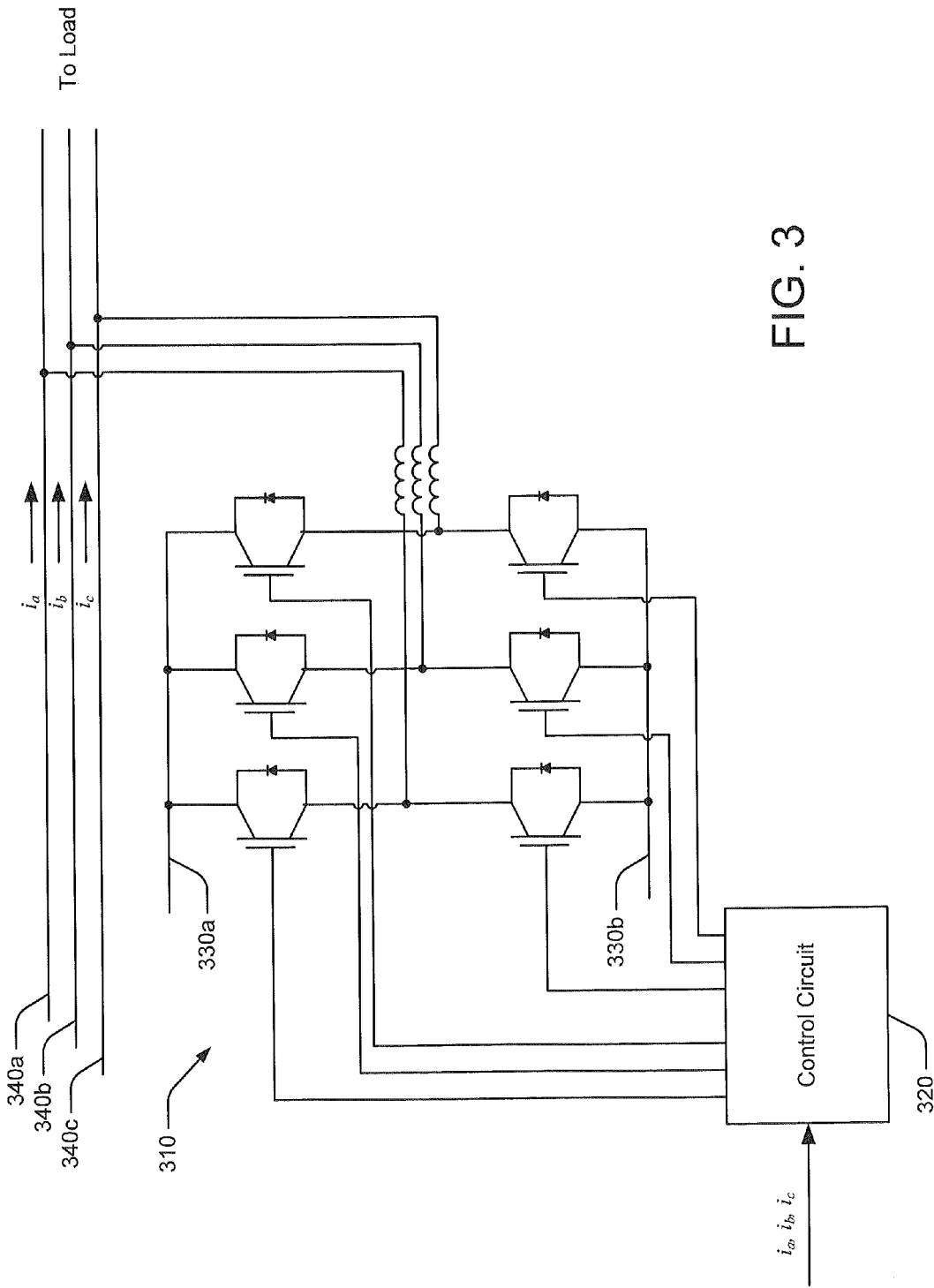
FIG. 3 is a schematic diagram illustrating an exemplary inverter implementation for the UPS system of FIG. 2 according to further embodiments of the inventive subject matter.

FIG. 3 illustrates an exemplary implementation of an inverter 310 and associated control circuit 320 that may be used in a system according to some embodiments of the inventive subject matter, e.g., in the UPS system 200 of FIG. 2. The inverter 310 comprises a plurality of pulse-width modulated (PWM) bridge circuits coupled to between two DC busses 330a, 330b and driven by the control circuit 320 responsive to control inputs, such as the phase currents $i_a$, $i_b$, $i_c$ of the phases 340a, 340b, 340c. The control circuit 320 may, for example, implement a control loop that acts to control duty cycles of the transistors of the bridge circuits of the inverter 310 to substantially equalize the phase currents $i_a$, $i_b$, $i_c$ by transferring current among the phases 340a, 340b, 340c and/or between the DC busses 330a, 330b and the phases 340a, 340b, 340c.

Figure 4:
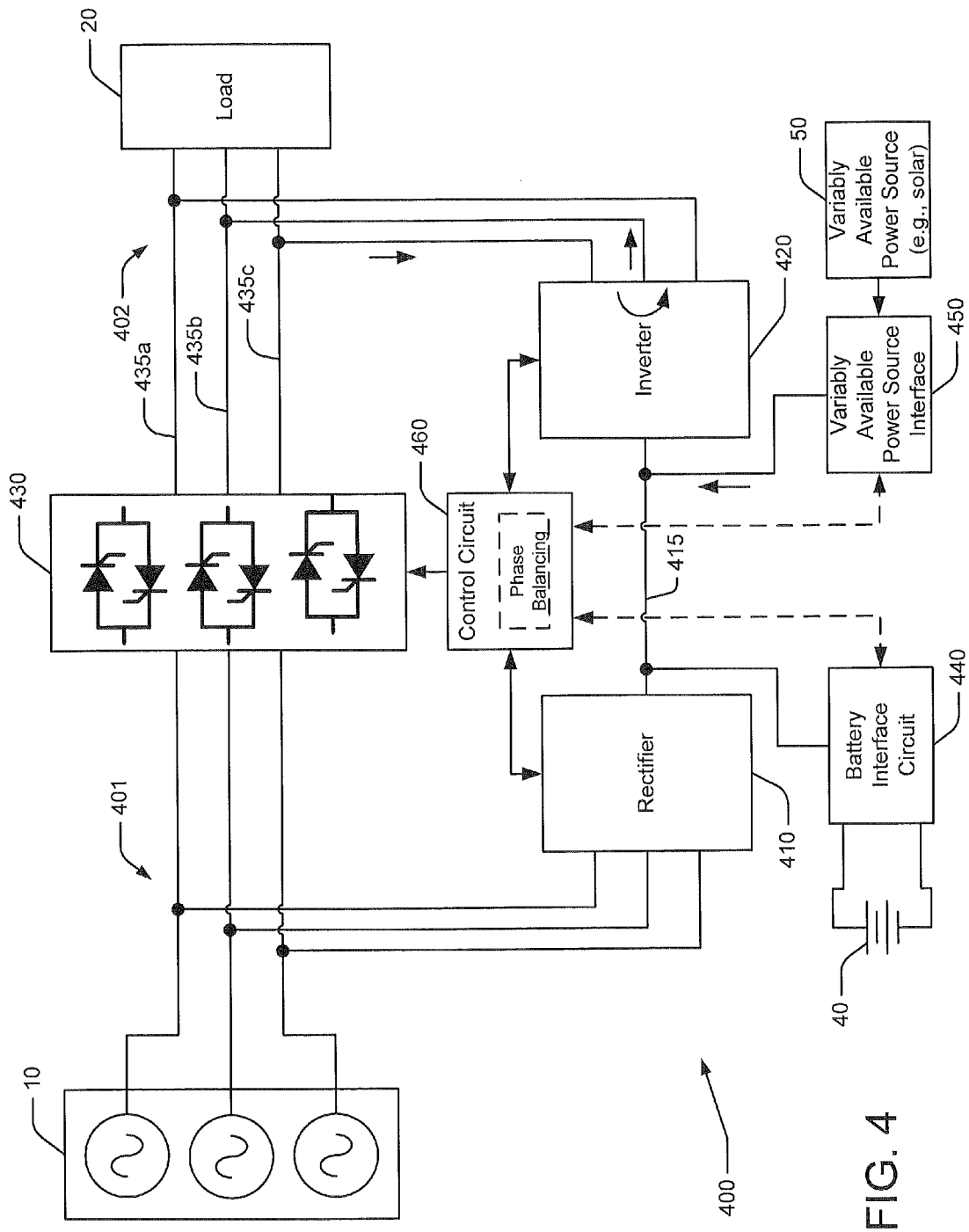
FIG. 4 is a schematic diagram illustrating a UPS system with an auxiliary variably available power source according to some embodiments of the inventive subject matter.

According to additional aspects of the inventive subject matter, a variably available power source, such as a solar power or wind power source, may be used in lieu of and/or in conjunction with phase balancing along the lines described above. FIG. 4 illustrates a UPS system 400 including a rectifier 410 and an inverter 420 coupled by a DC link 415. An input of the rectifier 410 is coupled to an AC input 401 that is configured to be coupled to an AC power source 10, and an output of the inverter 420 is configured to be coupled to a load 20 at an AC output 402. A bypass circuit, e.g., a static switch 430, is configured to couple and decouple the AC input 401 and the AC output 402. For example, the static switch 430 may be used to couple the AC input 401 to the AC output 402 and thereby bypass the rectifier 410 and inverter 420 in a high-efficiency bypass mode.

The UPS system 400 also includes a battery interface circuit 440 configured to couple the DC link to one or more batteries 40. In some embodiments, the battery interface circuit 440 may include, for example, a DC/DC converter circuit configured to convert between a voltage of the battery(s) 40 and a voltage of the DC link 415. In further embodiments, the battery interface circuit 440 may provide a non-voltage converting coupling between the battery(s) and the DC link. It will be appreciated that, in general, the battery interface circuit 440 may include any of a variety of components for coupling the battery(s) 40 and the DC link 415, such as fuses, switches, circuit breakers and the like, along with components that may provide, for example, current and/or voltage monitoring or circuit protection. The battery interface circuit 440 may support unidirectional or bidirectional power transfers between the DC link 415 and the battery(s) 40. For example, in addition to supporting power flow from the battery(s) 40 to the DC link 415 for backup power and phase balancing, the battery interface circuit 440 may also be used to charge the battery(s) 40 by transferring power from the DC link 415 to the battery(s).

The UPS system 400 further includes a variably available power source interface circuit 450, which is configured to interface a variably available power source 50, such as a solar and/or wind power source, to the DC link 415. In some embodiments, the variably available power source interface circuit 450 may include, for example, a DC/DC converter circuit configured to convert between a voltage of the variably available power source 50 and a voltage of the DC link 415. In further embodiments, the variably available power source interface circuit 450 may provide a non-voltage converting coupling between the variably available power source 50 and the DC link. It will be appreciated that, in general, the variably available power source interface circuit 450 may include any of a variety of components for coupling the variably available power source 50 and the DC link 415, such as fuses, switches, circuit breakers and the like, along with components that may provide, for example, current and/or voltage monitoring or circuit protection.

A control circuit 460 of the UPS system 400 is configured to control the rectifier 410, the inverter 420 and the static switch 430, and may further control the battery interface circuit 440 and/or the variably available power source interface circuit 450. Among other functions, the control circuit 460 may cause the static switch 430 to bypass the rectifier 410 and inverter 420 and control the inverter 420 to support phase balancing along the lines described above, e.g., by controlling current transfer among the phases 435a, 435b, 435c coupled to the static switch 430 and/or by selectively transferring power between the DC link 415 and the AC output 402. Power supplied by the variably available power source 50 may be used for such phase balancing purposes by, for example, selectively transferring power between the DC link 415 to the phases 435a, 435b, 435c.

It will be appreciated that some or all of the above-described components of the UPS system 400 may be integrated in one assembly or may be implemented using multiple interoperating assemblies with connecting power and control links.

Figure 5:
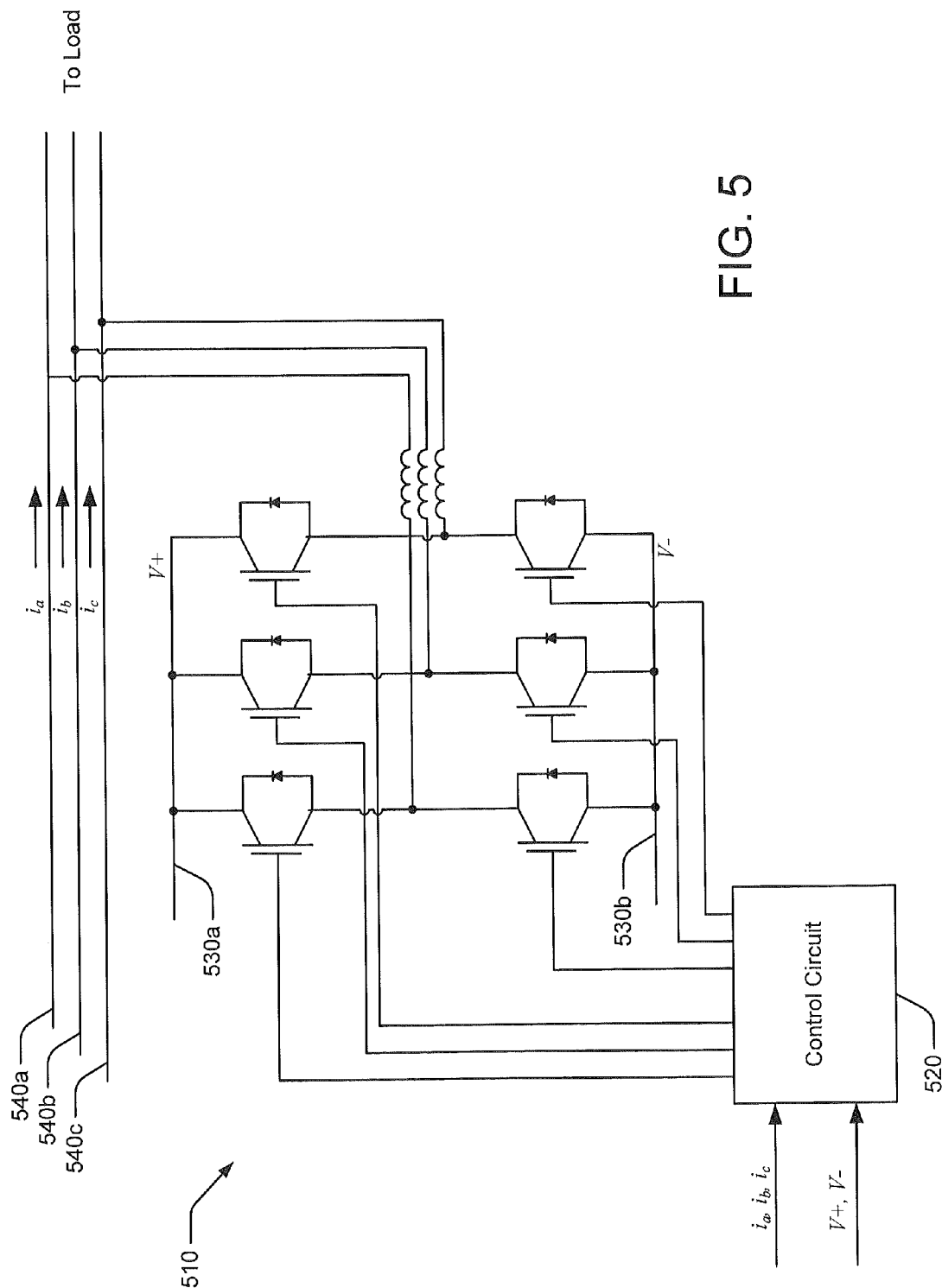
FIG. 5 is a schematic diagram illustrating an exemplary inverter implementation for the UPS system of FIG, 4 according to further embodiments of the inventive subject matter.

FIG. 5 illustrates an exemplary implementation of an inverter 510 and associated control circuit 520 that may be used in a system according to some embodiments of the inventive subject matter, e.g., in the UPS system 400 of FIG. 4. The inverter 510 comprises a plurality of pulse-width modulated (PWM) bridge circuits coupled to between two DC busses 530a, 530b and driven by the control circuit 520 responsive to control inputs, such as the phase currents $i_a$, $i_b$, $i_c$ of the phases 540a, 540b, 540c and the voltages V+, V− of the DC busses 530a, 530b. The control circuit 520 may, for example, implement a control loop that acts to control duty cycles of the respective transistors of the bridge circuits of the inverter 510 to substantially equalize the phase currents $i_a$, $i_b$, $i_c$ by transferring current among the phases 540a, 540b, 540c and/or between the DC busses 330a, 330b and selected ones of the phases 540a, 540b, 540c. The voltages V+, V− of the DC busses 530a, 530b may indicate, for example, if power for phase balancing is available from a variably available power source (e.g., a photovoltaic array or wind generator) coupled thereto.

Embodiments described above with reference to EEGs. 2-5 involve on-line UPS implementations. However, further embodiments of the inventive subject matter may be implemented in standby and line-interactive UPS configurations.

Figure 6:
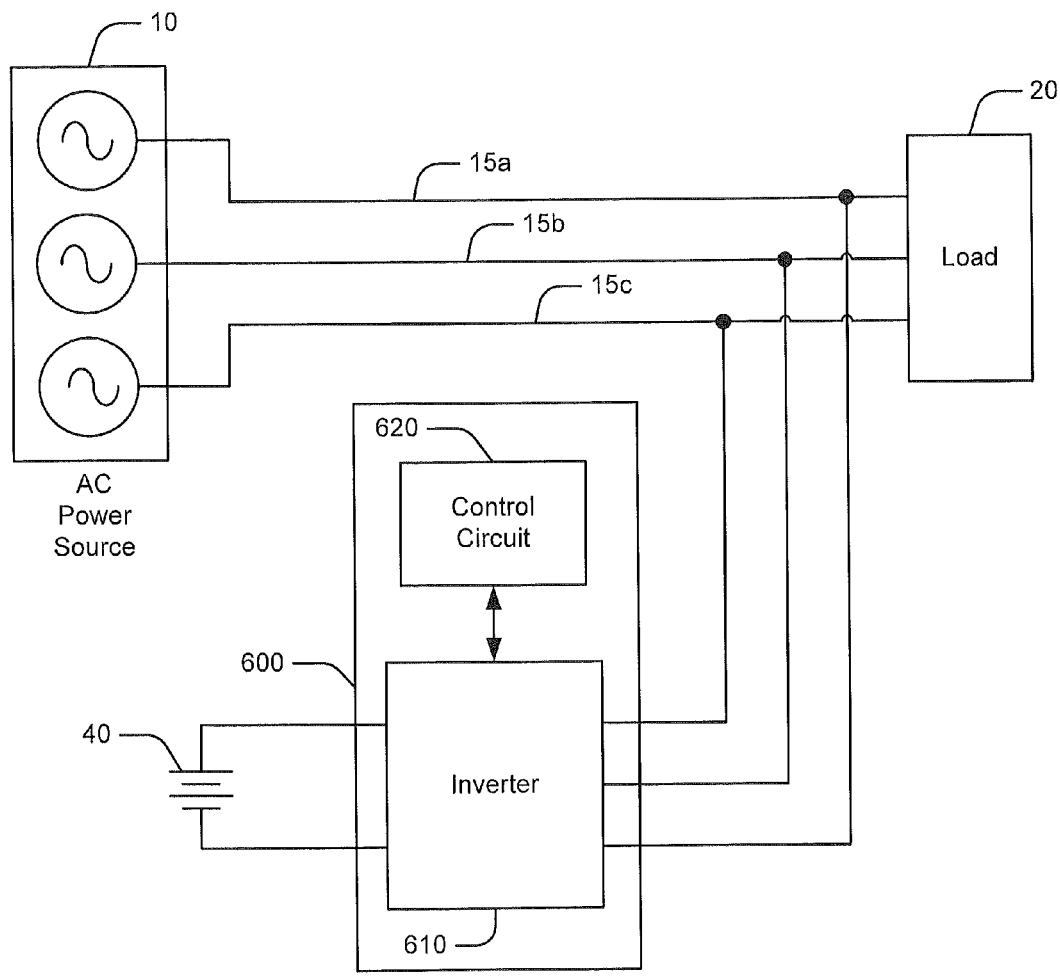
FIG. 6 is a schematic diagram illustrating a UPS system according to further embodiments of the inventive subject matter.

For example, referring to FIG. 6, a standby or line-interactive UPS system 600 may include an inverter 610 controlled by a phase-balancing control circuit 620 along lines described above and coupled to one or more batteries 40 that provide backup power. In particular, the inverter 610 may be configured to selectively load the phases 15a, 15b, 15c to support inter-phase power transfers that compensate for phase imbalance of the load 20 and/or may selectively transfer power between the one more batteries 40 and the phase 15a, 15b, 15c to compensate for phase imbalance. In some embodiments of the inventive subject matter, the battery(s) 40 may charged via the inverter 610, e.g., the control circuit 620 may operate the inverter as a rectifier to charge the battery(s) 40. Is some embodiments, the battery(s) 40 may be charged using a separate battery charger (not shown). A similar configuration may also be used with a variably available power source, such as a solar array, e.g., the battery (s) 40 may be replaced by a variably available power source. In some embodiments, a standalone device without auxiliary power source capability may also be used for phase balancing, for example, an inverter apparatus that uses capacitors for short-term energy storage to support inter-phase power transfers.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed:

1. A system, comprising:
   an AC input configured to be coupled to an AC power source;
   an AC output comprising a plurality of phases;
   a converter having an input coupled to the AC input and an output coupled to the AC output;
   a bypass circuit configured to selectively couple and decouple the AC input and the AC output; and
   a control circuit configured to cause the converter to compensate for an unbalanced loading of the phases of the AC output.

2. The system of claim 1, further comprising an auxiliary power source coupled to converter.

3. The system of claim 2, wherein the auxiliary power source comprises a battery.

4. The system of claim 3, wherein the auxiliary power source further comprises a variably available power source.

5. The system of claim 4, wherein the auxiliary power source comprises a wind power source and/or a solar power source.

6. The system of claim 2, wherein the auxiliary power source comprises a variably available power source.

7. The system of claim 6, wherein the auxiliary power source comprises a wind power source and/or a solar power source.

8. The system of claim 1, wherein the control circuit is configured to cause the converter to selectively transfer power between the auxiliary power source and the AC output to compensate for the unbalanced loading.

9. The system of claim 1, wherein the control circuit is configured to cause the converter to compensate for the unbalanced loading when the AC input is coupled to the AC input by the bypass circuit.

10. The system of claim 1, wherein the converter comprises:
    a rectifier having an input coupled to the AC input; and
    an inverter having an input coupled to an output of the rectifier and an output coupled to the AC output.

11. A system, comprising:
    a converter having an AC output comprising a plurality of phases and an input configured to be coupled to a variably available power source; and
    a control circuit configured to cause the converter to selectively transfer power to and from the variably available power source to compensate for an unbalanced loading of the phases of the AC output.

12. The system of claim 11, wherein the variably available power source comprises a wind power source and/or a solar power source.

13. The system of claim 11, wherein the input of the converter is further configured to be coupled to a battery and wherein the control circuit is further configured to cause the converter to selectively transfer power to and from the battery to compensate for the unbalanced loading.

14. The system of claim 11, further comprising an AC input and a bypass circuit configured to selectively couple and decouple the AC input and the AC output of the converter and wherein the control circuit is configured to cause the converter to compensate for the unbalanced loading when the AC input is coupled to the AC output of the converter by the bypass circuit.

15. The system of claim 11, wherein the converter comprises an inverter configured to generate an AC voltage at the output of the converter from a DC voltage at an input of the converter.

* * * * *